United States Patent [19]

Long

[11] Patent Number: 4,643,363
[45] Date of Patent: Feb. 17, 1987

[54] PROCESS FOR DEAGGLOMERATING AND CLASSIFYING PHOSPHORS

[75] Inventor: Robert A. Long, Towanda, Pa.

[73] Assignee: GTE Products Corporation, Stamford, Conn.

[21] Appl. No.: 270,290

[22] Filed: Jun. 4, 1981

[51] Int. Cl.[4] .................................................. C22B 3/00
[52] U.S. Cl. ........................................ 241/20; 241/21; 241/24
[58] Field of Search .................... 241/16, 20, 21, 24, 241/30, 46.02, 89, 171

[56] References Cited

U.S. PATENT DOCUMENTS

| | | | |
|---|---|---|---|
| 1,587,623 | 6/1926 | Zuckerman | 241/20 |
| 3,165,269 | 1/1965 | Blackburn et al. | 241/21 X |
| 3,387,793 | 6/1968 | Burner | 241/20 |
| 3,599,879 | 8/1971 | Clark | 241/20 X |
| 4,269,808 | 5/1981 | Kawabata | 241/20 X |

Primary Examiner—Timothy V. Eley
Attorney, Agent, or Firm—James Theodosopoulos

[57] ABSTRACT

Fired phosphor powder is deagglomerated by introducing a slurry thereof to the bottom of a vibratory mill while water is added to the top of the mill. This establishes a vertical gradient in the phosphor concentration in the slurry, the bottom being thicker than the top. The fine phosphor particles move out faster through an outlet at the top, while the coarse particles receive longer milling time.

3 Claims, 1 Drawing Figure

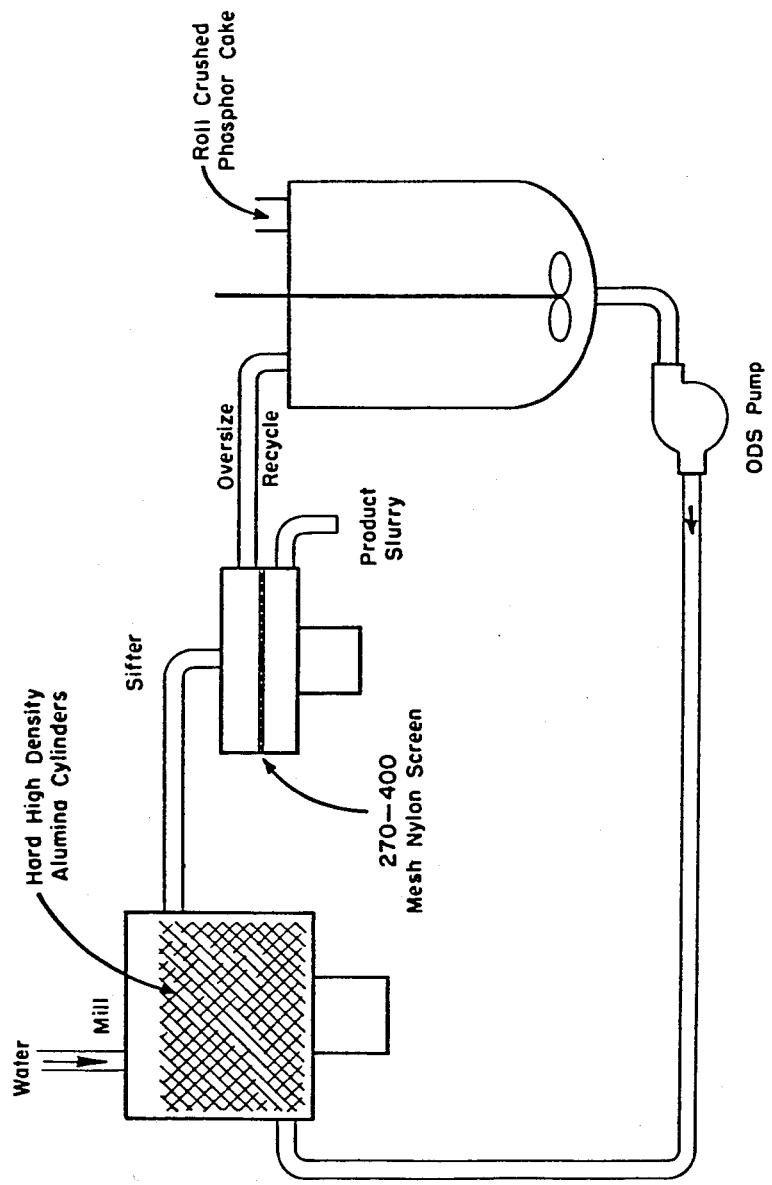

PROCESS FOR DEAGGLOMERATING AND CLASSIFYING PHOSPHORS

Phosphors are generally made by blending raw materials and then firing the blend at a high temperature to combine the raw materials to form the phosphor. In the case of phosphors for fluorescent lamps, for example, the firing is generally at temperatures above about 1000° C. The fired phosphor cake is generally lumpy and must be deaglomerated before it can be mixed into suitable phosphor-coating suspensions. Also, the phosphor is often classified to removal undesirable particle sizes. Previous methods for deagglomerating the phosphor were hammer-milling, pebble-milling, attrition-milling and ball-milling, as disclosed in U.S. Pat. Nos. 2,987,414; 3,023,339; 3,470,106; 3,639,253 and 3,919,109. Such deagglomeration methods are generally batch processes.

This invention, in contrast, is concerned with an improved method for deagglomerating phosphors, which is a continuous process. This invention uses a vibratory wet mill, such as is disclosed in U.S. Pat. No. 3,165,269, to deagglomerate the fired phosphor. In the process disclosed in said patent, phosphor and water are fed into a mixing vat above the vibratory mill to form a suspension, which is gravity-fed through a feed pipe to the bottom of the vibratory mill vessel. The suspension flows upwards in the vessel and is milled by the rapidly vibrating hard ceramic milling elements therein. The milled suspension flows out through a pipe at the top of the vessel to a mixing vat, where water is added, and is then pumped to a two stage cyclone separator where undesirable fine and coarse particles are removed.

My invention provides several advantages over the process disclosed in said patent. Water is added to the top of the vibratory mill at the same time that the phosphor suspension is fed to the bottom of the mill, with the result that there is a gradient in the specific gravity of the phosphor suspension from the bottom to the top of the mill. This leads to more efficient milling because the fine phosphor particles are moved out of the mill faster, and the coarse particles remain in the mill for longer milling. Also the use of a sifter instead of the prior art cyclone separator results in more uniform phosphor coating suspensions because the sifter separates undesired coarse particles with better demarcation.

The drawing is a schematic of apparatus for practicing one embodiment of the invention.

After the phosphor has been fired, the phosphor cake is roll crushed into smaller agglomerates or lumps and is then slurried and maintained in suspension by, for example, a stirrer, in a suitable container, as shown in the drawing.

The phosphor slurry is pumped to the bottom of a vibratory mill the action of which moves the phosphor slurry up through the milling elements and out through an overflow pipe near the top of the mill. At the same time deionized water is introduced into the mill at the top, resulting in dilution of the phosphor slurry in the upper part of the mill. In one example, the mill was a Sweco M-45 containing 1600 pounds of high density ½" alumina cylinders as the milling elements. The phosphor slurry was pumped, at about 5 to 10 gallons per minute, to the bottom of the mill at a specific gravity of about 1.5 to 1.6, which was thick enough to keep the coarse particles of phosphor in suspension. Deionized water, at the rate of about 3 gallons per minute, was introduced to the top of the mill, which diluted the upper portion of the phosphor slurry to a specific gravity of about 1.3. This had several beneficial effects. It permitted the fine particles to be moved up and out of the mill faster, while coarse particles remained or settled back into the ceramic elements for longer milling. Also, the diluted slurry sifts faster and more efficiently than the thicker slurry.

The diluted slurry flowing out of the vibratory mill flowed into a continuous sifter which removed the undesirable coarse particles, which were then recycled back into the container in which roll-crushed phosphor cake is slurried. The desired phosphor particles which, in this embodiment, were those that passed through a 270-400 mesh screen, are designated as product slurry in the drawing. The milled and sifted phosphor, either dried or in slurry form or filtered or the like, is then mixed with suitable ingredients, as is known in the art, to make a phosphor-coating suspension for applying a phosphor coating to fluorescent lamp tubes.

I claim:

1. A method of making a phosphor-coating suspension comprising the steps of: preparing an aqueous slurry of a phosphor powder and introducing the slurry to the bottom of a vibratory mill at a predetermined rate; introducing water to the top of the mill at a predetermined rate and under such conditions that the specific gravity of the phosphor slurry is greater at the bottom of the mill than it is at the top of the mill whereby coarse phosphor particles are milled for a longer period of time than are fine phosphor particles; removing the milled phosphor slurry out through an outlet at the top of the mill; and mixing the milled phosphor with suitable ingredients to form a phosphor-coating suspension.

2. The method of claim 1 including the additional step of continually sifting the phosphor slurry from the vibratory mill to remove undesired coarse particles.

3. The method of claim 2 including the additional step of continualy recycling the undesired coarse particles to the vibratory mill for further milling.

* * * * *